United States Patent [19]

Austin et al.

[11] 4,021,385
[45] May 3, 1977

[54] POLYURETHANE FOAMS RESISTANT TO DISCOLORATION

[75] Inventors: Arthur L. Austin, Southgate; William W. Levis, Jr.; John T. Patton, Jr., both of Wyandotte, all of Mich.

[73] Assignee: BASF Wyandotte Corporation, Wyandotte, Mich.

[22] Filed: Dec. 30, 1974

[21] Appl. No.: 537,999

[52] U.S. Cl. .................. 260/2.5 BB; 260/45.9 QB; 260/77.5 SS; 260/611.5
[51] Int. Cl.$^2$ .................. C08G 18/14; C08K 5/13; C08G 18/48
[58] Field of Search .............. 260/2.5 BB, 77.5 SS, 260/45.9 QB, 611.5

[56] References Cited

UNITED STATES PATENTS

| | | | |
|---|---|---|---|
| 3,437,694 | 4/1969 | Austin | 260/2.5 BB |
| 3,494,880 | 2/1970 | Austin | 260/2.5 BB |
| 3,567,664 | 3/1971 | Haring | 260/2.5 BB |
| 3,637,865 | 1/1972 | Haring | 260/611.5 |
| 3,715,381 | 2/1973 | Spaunburgh et al. | 260/77.5 CR |
| 3,734,880 | 5/1973 | Finelli | 260/77.5 AT |
| 3,904,706 | 9/1975 | Hoeschele | 260/45.9 QB |
| 3,942,672 | 3/1976 | Saracsan | 260/77.5 CR |

*Primary Examiner*—H.S. Cockeram
*Attorney, Agent, or Firm*—John W. Linkhauer; Bernhard R. Swick; Robert E. Dunn

[57] ABSTRACT

Polyether polyols may be synergistically stabilized against oxidation by incorporating therewith 4,4'-bis (alphadimethylbenzyl) diphenyl amine and a 2,6-di-t-butyl-4-(lower alkyl) phenol such as 2,6-di-t-butyl-4-methyl phenol or 2,6-di-t-butyl-4-butyl phenol. The stabilized polyols inhibit color formation when employed in the preparation of polyurethane foams.

10 Claims, No Drawings

POLYURETHANE FOAMS RESISTANT TO DISCOLORATION

DESCRIPTION OF THE INVENTION

The present invention relates to stabilized polyether polyol compositions and to their use in the preparation of polyurethane foams. Particularly, the invention relates to certain combinations of stabilizers which synergistically improve the oxidative stability of polyether polyols and retard the formation of peroxides in the polyether and consequently the formation of color in polyurethane foams prepared from the stabilized polyether polyols.

Polyurethane foams are well known in the art. They are generally prepared by the catalyzed reaction, in the presence of a blowing agent, of an organic polyisocyanate with a hydroxy-terminated compound. For several reasons, polyether polyols have been found to be particularly useful hydroxyl-terminated compounds in the preparation of polyurethane foams. One disadvantage with the use of polyethers as foam intermediates is that under certain conditions these polyols are subject to oxidation. This causes (1) discoloration in the foam and (2) diminution in the reactivity of the foam formulation.

The discoloration is the result of the products of oxidation of polyethers which result from the decomposition of peroxides formed in the polyol when the polyol is exposed to air. These oxidation products appear in the form of aldehydes and acids. In addition, the presence of the peroxides in the polyethers has an adverse effect upon foam reaction. The polyether peroxides, which represent the first stages of oxidation of the polyol, if not decomposed into acids and aldehydes upon storage of the polyol, will when subjected to the high temperatures encountered during the urethane foam manufacturing process decompose to produce a further concentration of aldehydes and acids. These decomposition products lead to formation of brown colors in the foam. Moreover, if the concentration of peroxides is sufficiently high, then the polymer structure in the foam composition is degraded to a degree such that the foam loses its desired strength properties and becomes a commercially unacceptable product.

However, the presence of products of oxidation in the polyol is not the only cause of discoloration in polyurethane foams. Often, stabilizers, particularly phenolic compounds, are added to polyether polyols to inhibit the oxidation and discoloration thereof. Although these stabilizers have been particularly effective in their purpose as they provide protection, they themselves are selectively oxidized and consumed. In their oxidized forms, many of these stabilizers are in themselves highly colored and possess a high tinctorial power. Thus by their mechanism of protection of polyether they form highly colored compositions. As a result, most phenolic compounds, although they might ostensibly appear to stabilize the polyether against oxidation, adversely affect the use of the polyols in polyurethane formation by virtue of their color formation.

Further, if the polyether has been oxidized to the point such that the acid content of the polyether, as determined by pH measurement, is significantly high, then the reactivity of the foam system is adversely affected. It is generally recognized that the more acidic the polyether, the lower will be the reaction rate of the foam system. A further disadvantage to the use of polyether polyols which contain significant levels of peroxide is that the latter compounds, which are oxidizing agents, will attack the stannous salts used as urethane catalysts, converting them from their active stannous form into an inactive oxidized form which contains the —Sn—O—Sn— structure. This oxidation of the polyether polyol is readily caused by the exposure of the polyether polyol to air or to oxygen, particularly in the presence of heat.

Accordingly, it is an object of the present invention to provide for highly stabilized polyether polyols. It is a further object of the invention to provide for polyether polyols which inhibit discoloration when employed in the preparation of polyurethane reactive formulations. Another object of the invention is to provide for the use of phenolic compounds in combination with an amine compound as a stabilizer system for polyether polyols and for polyurethane foams prepared therewith. These and other objects of the invention will be apparent from the specification and examples which follow.

Now, in accordance with the present invention, it has been determined that polyether polyols may be synergistically stablized against oxidation by incorporating therewith a combination of a hindered phenol of the structure

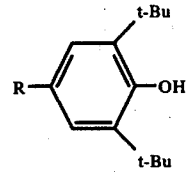

where R is alkyl of 1 to 9 carbon atoms with 4,4'-bis (alphadimethylbenzyl) diphenyl amine, and that these stabilized polyols inhibit color formation when employed in the preparation of polyurethane foams. As demonstrated hereinafter, it was both surprising and unexpected that these combinations co-act in such an efficacious manner.

The total amount of the combination of hindered phenol and amine which is generally employed in accordance with this invention is from 0.05 part to about 0.5 part, preferably from about 0.1 part to about 0.2 part, per 100 parts by weight of polyether polyol. The amount will depend upon the use of the polyol which is to be stabilized. It is to be understood that any amount which synergistically affects the stability of polyol is within the scope of the present invention. Equal or unequal amounts of each additive may be employed. However, each mixture of additives should generally contain 10 weight percent or more of each of the additives, taking the total of the additives as 100%.

The polyether polyols which may be stabilized in accordance with the invention are those compounds having at least two hydroxyl groups. They are generally prepared by the catalytic polymerization of an alkylene oxide or a mixture of alkylene oxides, in the presence of an initiator which is an organic compound having at least two active hydrogen atoms. The lower alkylene oxides such as ethylene oxide, propylene oxide and 1,2- and 2,3-butylene oxide are preferred. Numerous organic compounds having at least two active hydrogen atoms may be employed as initiators. Preferred compounds are polyhydric alcohols such as ethylene glycol, propylene glycol, 1,2-butylene glycol, 1,4-butanediol, 1,5-pentanediol, 1,6-hexanediol, glycerol, trimethylolpropane, 1,2,6-hexanetriol, sorbitol, sucrose, alphamethylglucoside, and pentaerythritol. Other useful compounds include organic acids such as adipic acid, succinic acid, aconitic acid, and trimellitic acid; inorganic acids such as the phosphoric acids; amines such as methylamine, ethylamine, ethylenediamine, diethylenetriamine, toluene diamine, aniline, methylenedianiline, and piperazine; phenolic compounds such as Bisphenol A, pyrogallol, resorcinol, and inositol; mercaptans such as 1,2-ethanediol and 1,2,3-propanethiol; and amides such as acetamide and benzene sulfonamide. Mixtures of any of the above may also be employed.

Particularly preferred polyether polyols are those derived from propylene oxide and water, trimethylolpropane, propylene glycol, dipropylene glycol or glycerol and having molecular weights from about 400 to 30,000.

The preparation of polyurethane foams from the stabilized polyether polyols of the present invention may follow any of the standard prior art procedures. Thus, the so-called "pre-polymer", "quasi-prepolymer" or "one-shot" methods may be employed. Along with the stabilized polyethers, an organic polyisocyanate, a catalyst, a surfactant, and a blowing agent are generally employed. Various other additives, all well known in the art, may also be employed if desired. The preparation of polyurethane foams and the reactants employed in the preparation are well known in the art as evidenced by U.S. Pat. Nos. 3,072,582; 3,091,551 and 3,112,281, all of the disclosures thereof being incorporated herein by reference thereto.

The following examples, illustrate the invention. All parts are by weight unless otherwise stated.

EXAMPLE I

The polyether polyol employed in this example was a 3,000-molecular weight ether triol prepared from polypropylene oxide and glycerol. Stability tests on the polyol were carried out as follows.

In each test, a vessel, equipped with bubbler, thermometer, stirrer and air outlet was charged with the above polyol and various candidate stabilizers. After thoroughly mixing the charge, air was bubbled therethrough and heat was applied thereto for three hours.

In determining the oxidative susceptibility of the samples thus tested, tests of three kinds were conducted: (1) a test for change in pH; (2) a test of APHA color; and (3) a test for peroxide development.

The pH-change test involved determining the apparent pH, before and after exposure to oxidation conditions as indicated above, of alcohol-water solutions of polyol samples, using glass electrodes and a pH meter, in accordance with practices known to those skilled in the art. Ordinarily, substantial degradation is accompanied by a substantial decrease in the observed apparent pH, i.e., an increase in the acidity of the polyol.

The APHA color test may be conducted as disclosed in *Standard Methods for the Examination of Water and Sewage*, 9th Edition, published 1946, by the American Public Health Association, pages 14 and 15. In the APHA test, low color rating numbers indicate freedom from color: distilled water has an APHA color rating of 0. It is essential that the stabilizing combination give an APHA color before oxidation of 20 or lower. In general, it is desirable (though not always necessary) to obtain polyether polyols that, after exposure to oxidation conditions as indicated above, do not have an APHA color rating greater than 40. The oxidation test is severe; satisfactory foams have been made with polyols exhibiting APHA colors after oxidation as high as 80. The peroxide development test involves adding a few crystals of potassium iodide to a sample. If peroxides are present, indicating at least incipient degradation or conditions favorable to degradation, then the potassium iodide is converted to free iodine, which imparts a noticeable color to the sample.

Table 1 shows the results obtained when various candidate stabilizers were tested as described above.

Table 1

| Candidate Stabilizer | Temp., °C. | APHA Color Before | APHA Color After | pH Before | pH After | Peroxide Present |
|---|---|---|---|---|---|---|
| 0.52% A | 145 | 0–5 | 100 | 8.15 | 5.9 | Yes |
| 0.20% B | 145 | 5 | >100 | 8.25 | 4.85 | Yes** |
| 0.10% A <br> 0.10% B | 145 | 0–5 | 0–5 | 7.95 | 7.95 | No |
| 0.125% A <br> 0.125% B | 145 | 10 | 30 | 8.1 | 8.1 | No |
| 0.05% A <br> 0.05% B <br> 0.05% C | 145 | 0–5 | 0–5 | 8.5 | 8.5 | No |
| 0.5% D | 145 | 5 | >100 | 6.6 | 5.4 | Yes |
| 0.20% B <br> 0.20% D | 145 | 5 | 20 | 6.6 | 6.6 | No |
| 0.4% B <br> 0.05% C | 145 | 10 | 100 | 8.3 | 5.0 | Yes |
| 0.4% A <br> 0.05% C | 145 | 0.–5 | 20 | 8.35 | 6.55 | ND* |

A = 2,6-di-t-butyl-4-methylphenol
B = 4,4'-bis(α-dimethylbenzyl)diphenylamine
C = phenyl didecyl phosphite
D = 2,6-di-t-butyl-4-butylphenol
*ND = not determined
** = Inferred from pH change; oxidized solution too dark to read KI test.

Results presented in Table 1 show the surprising synergistic effect of the stabilizer combinations of the present invention. To illustrate, a polyol containing 0.52% of stabilizer A or a polyol containing 0.20 weight percent of stabilizer B exhibited, upon testing, a substantial change in APHA color and a great decrease in observed pH, whereas a polyol containing 0.10% each of A and B was substantially stable, with no change in APHA color or pH, and no development of peroxide. Similarly, in compositions containing 0.05% of C as an additional optional ingredient, materials containing 0.4% of B with such a proportion of C, or containing 0.4% of A to such a proportion of C exhibited color changes, pH changes, or peroxide development indicating instability, whereas the material containing 0.05 weight percent of each of A, B, and C had no change in color or pH and no development of peroxide.

EXAMPLE 2

The stability of a polyether polyol having a molecular weight of about 3500 and prepared by the condensation of a mixture of ethylene oxide and propylene oxide with glycerol is tested as described in Example 1. The stabilizer combinations are the same as employed in the previous example. Results of the test indicate that although satisfactory results are not obtained with either candidate stabilizer A or stabilizer B alone, a surprising synergistic effect is obtained when a combination of A and B is employed.

Similar results are obtained when the polyether polyols tested are:
1. 700-molecular weight glycol prepared by the condensation of propylene oxide with propylene glycol;
2. 12,000-molecular weight triol prepared by the condensation of a mixture of ethylene oxide and butylene oxide with trimethylolpropane; and
3. 5,000-molecular weight polyol prepared by the condensation of propylene oxide and Bisphenol A.

EXAMPLE 3

A polyether polyol as used in Example 1 was stabilized with 0.2% of 2,6-di-t-butyl-4-methylphenol, 0.2% of 4,4'-bis(α-dimethylbenzyl)diphenylamine and 0.05% of phenyl didecyl phosphite. This stabilized polyol was used to prepare a polyurethane foam by a one-shot process according to the recipe indicated below.

| Ingredient | Parts by Weight |
| --- | --- |
| Polyol | 100 |
| Water | 4.4 |
| Silicone surfactant | 0.9 |
| Catalyst A* | 0.3 |
| Catalyst B* | 0.2 |
| Toluene diisocyanate | 58.9 |

*Triethylene diamine dissolved in dipropylene glycol.
*Stannous octoate.

Immediately after the formation of a polyurethane foam, a scorch test was conducted as follows. Skinless 3-inch cubes of the foam material to be tested were placed into a circulating-air oven maintained at 185° C. and permitted to remain there for two hours. The cubes were then removed and examined for color and evidence of scorching. No scorching was detected.

EXAMPLE 4

Example 3 (preparation of polyurethane foam and scorch test) was repeated except that there was used the a polyol stabilized with 0.15% of each of 2,6,t-butyl-4-methylphenol and 4,4'-bis(α-dimethylbenzyl)-diphenylamine. The results were the same as before—no scorching was observed.

While we have disclosed herein certain embodiments of our invention, we intend to cover as well any change or modification therein which may be made without departing from its spirit and scope.

We claim:
1. A polyurethane foam prepared by the reaction of an organic polyisocyanate with a polyether polyol in the presence of a blowing agent, said polyether polyol being a condensation product of an alkylene oxide or mixture of alkylene oxide and a polyhydric alcohol, said product being stabilized against oxidation with from about 0.05 to 0.5 parts by weight of said product of a combination of 4,4'-bis(alphadimethylbenzyl) diphenylamine and a compound of the formula

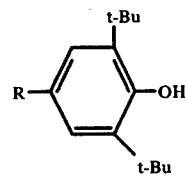

where R is an alkyl of 1 to 9 carbon atoms, said combination containing 10 weight percent or more of each of said amine and said compound, taking said combination as 100 percent.
2. The foam of claim 1 where R is methyl.
3. The foam of claim 1 where R is butyl.
4. The foam of claim 1 wherein the polyether polyol is a condensation product of propylene oxide and a polyhydric alcohol.
5. The foam of claim 4 wherein the polyhydric alcohol is selected from the group consisting of glycerol, trimethylolpropane and propylene glycol.
6. The foam of claim 5 where R is methyl.
7. The foam of claim 5 where R is butyl.
8. The foam of claim 1 wherein the condensation product is stabilized with from 0.1 to 0.2 parts of the combination per 100 parts of condensation product.
9. The foam of claim 8 where R is methyl.
10. The foam of claim 8 where R is butyl.

* * * * *